(No Model.)
N. JOHNSON.
COMBINED HAME AND HORSE COLLAR.
No. 366,219. Patented July 12, 1887.
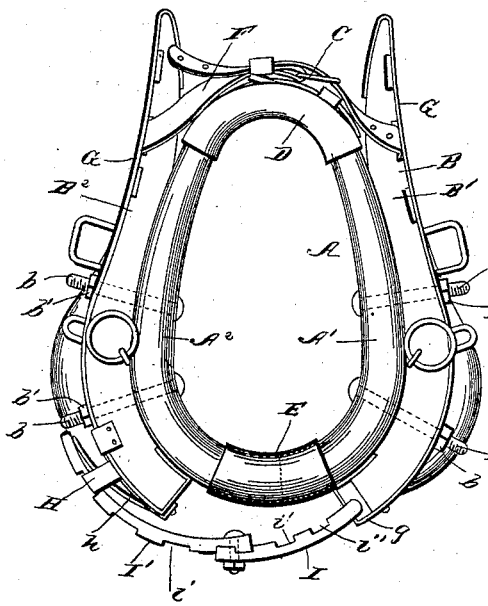
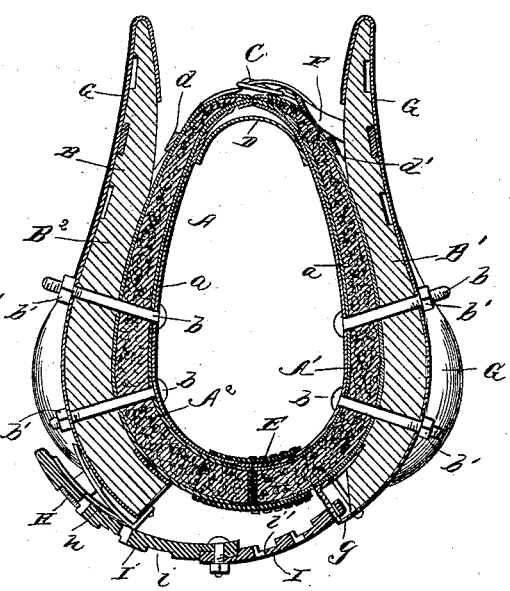
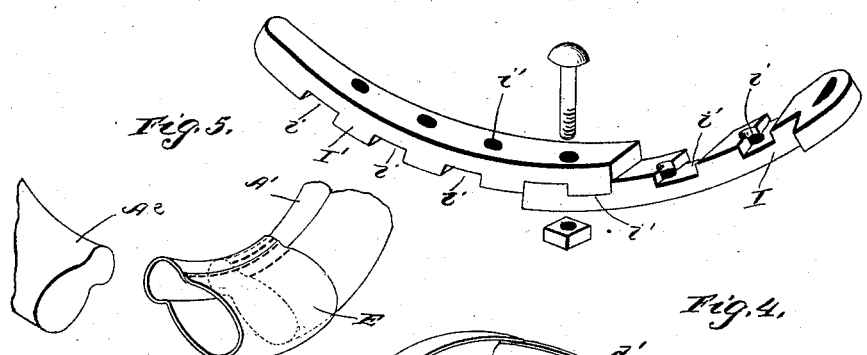
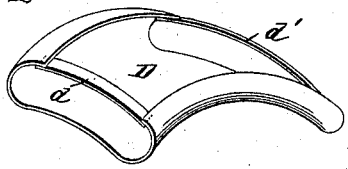
Witnesses
C. L. Taylor.
R. W. Bishop.
Inventor
Nels Johnson
By his Attorneys
C. A. Knowles

UNITED STATES PATENT OFFICE.

NELS JOHNSON, OF GLADSTONE, ILLINOIS.

COMBINED HAME AND HORSE-COLLAR.

SPECIFICATION forming part of Letters Patent No. 366,219, dated July 12, 1887.

Application filed January 20, 1887. Serial No. 224,896. (No model.)

*To all whom it may concern:*

Be it known that I, NELS JOHNSON, a citizen of the United States, residing at Gladstone, in the county of Henderson and State of Illinois, have invented a new and useful Improvement in Horse-Collars and Hame Self-Lock Combined, of which the following is a specification.

My invention relates to improvements in combined hames and horse-collars; and it consists in certain novel features, hereinafter described and claimed.

In the accompanying drawings, which fully illustrate my invention, Figure 1 is a front elevation of my improved combined hame and collar. Fig. 2 is a vertical sectional view, and Fig. 3 is a detail view of the fastening. Fig. 4 is a detail view of the pad. Fig. 5 is a detail perspective view of the ring E.

Referring to the drawings by letter, A designates the collar, and B the hame. The collar and hame are permanently secured together by means of bolts $b$, inserted through the collar and hame, and fastened by nuts $b'$ on the outside of the hame. On the inner side of the collar, just inside of the covering, I provide the metal strips $a$, which extend the entire length of the collar and prevent the heads of the bolts $b$ being drawn through the leather covering of the collar, and thereby splitting and otherwise injuring and destroying the same. The collar is made in two parts, $A' A^2$, joined at their upper ends by straps C, of ordinary construction, and detachably connected at their lower ends, in a manner presently described.

D designates a pad, which is carried by the upper end of the collar. It is provided on its upper side, at its opposite ends, with loops $d$ $d'$, through which the ends of the two parts of the collar are inserted, as shown. This pad serves to prevent the chafing of the upper side of the horse's neck by forming a smooth bearing-surface therefor and keeping the meeting ends of the two parts of the collar out of contact therewith. The lower end of one part, $A'$, of the collar carries a leather ring, E, which encircles said lower end and projects from the same. In operation the end of the other part, $A^2$, is made to enter this ring, and the collar thus made to surround the horse's neck. This ring E, it is apparent, protects the lower portion of the horse's neck from chafing in the same manner that the pad D prevents the chafing of the upper portion.

The hame B is formed in two sections or parts, $B' B^2$, as is usual, and these parts are connected at their upper ends by a strap, F, as shown. Each of these parts is provided with a metallic re-enforcing band, G, which is secured to the inner sides thereof, near their upper ends, and is passed up to and over said upper ends, and then downward upon the outer sides of the hame-sections to the lower ends thereof. At the lower end of one section, $B'$, the band G is extended slightly, and then bent upon itself and secured to the inner side of the hame-section, as shown. This construction provides the loop $g$, which carries the fastening-plates, as more fully referred to presently. The strap G on the hame-section $B^2$ is bent around the end thereof, but is not extended past the same. To the outer side of this hame-section, near its lower end also, I secure a metallic loop or keeper, H, and a leaf-spring, $h$, working in said loop.

I I' are two metal plates, which, together with the loop or keeper H and spring $h$, form the fastening device. These plates are carried by the loop $g$ of one hame-section and engage the loop or keeper H of the other section. The plate I is provided on its upper side with a series of notches, $i$, and the plate I' is provided on its under side with a series of similar notches, $i'$. Each of the plates is provided with a series of openings, which are so arranged that they will align when the two plates are placed together and bolts are passed through these aligned openings to secure the plates together. The notches on one plate engage the lugs on the other plate, and the two plates can be readily adjusted upon each other to suit any size of neck. When the plate I' has been inserted through the loop H, the spring $h$ will press the said plate against the cross-bar of the loop, which then will engage one of the notches of the said plate, and consequently securely fasten the two hame-sections together.

It will be seen that by my device a single fastening secures both the hame and the collar, and both are placed upon the horse's neck at one time, thereby enabling the user to harness a horse in much less time than was possible with the old devices. It will also be seen that the hame is prevented from slipping off the collar when the horse is being backed.

The operation of my device will be readily understood from the foregoing description, considered in connection with the accompanying drawings.

Having thus described my invention, what I claim, and desire to secure by Letters Patent, is—

1. The combination, with the hame-sections, of the fastening-plates carried by one section, a keeper upon the other section to receive the said plates, and a spring secured to the said section and pressing the plate outward into engagement with said keeper, substantially as specified.

2. The combination, with the hame-sections, of the plates I I', having engaging-notches and lugs carried by one section, and the keeper H and spring h upon the other section engaged by the said plates, substantially as specified.

In testimony that I claim the foregoing as my own I have hereto affixed my signature in presence of two witnesses.

NELS JOHNSON.

Witnesses:
GEORGE F. APPLEBY,
MATTIE LYNN.